United States Patent
Luo et al.

(10) Patent No.: US 11,356,755 B2
(45) Date of Patent: Jun. 7, 2022

(54) MULTIPLE-RATE OPTICAL NETWORK UNIT (ONU) ACTIVATION

(71) Applicant: Huawei Technologies Co., Ltd., Shenzhen (CN)

(72) Inventors: Yuanqiu Luo, Cranbury, NJ (US); Bo Gao, Wuhan (CN); Frank Effenberger, Frisco, TX (US); Xiang Liu, Marlboro, NJ (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/926,070

(22) Filed: Jul. 10, 2020

(65) Prior Publication Data
US 2020/0344534 A1 Oct. 29, 2020

Related U.S. Application Data

(63) Continuation of application No. PCT/CN2019/091201, filed on Jun. 14, 2019.
(Continued)

(51) Int. Cl.
*H04Q 11/00* (2006.01)

(52) U.S. Cl.
CPC . *H04Q 11/0067* (2013.01); *H04Q 2011/0064* (2013.01); *H04Q 2011/0088* (2013.01)

(58) Field of Classification Search
CPC combination set(s) only.
See application file for complete search history.

(56) References Cited

U.S. PATENT DOCUMENTS

2002/0109875 A1 * 8/2002 Eijk .................. H04J 14/0291
    398/2
2008/0002977 A1 * 1/2008 Mori .................. H04J 14/0282
    398/71
(Continued)

FOREIGN PATENT DOCUMENTS

CN          182091 A      1/2016
CN      106685591 B  * 12/2016  ............... H04L 1/00
(Continued)

OTHER PUBLICATIONS

"Series G: Transmission Systems and Media, Digital Systems and Networks, Access networks—Optical line systems for local and access networks, 10-Gigabit-capable symmetric passive optical network (XGS-PON) Amendment 1," ITU-T, G.9807.1, Amendment 1, Oct. 2017, 290 pages.
(Continued)

*Primary Examiner* — Omar S Ismail
(74) *Attorney, Agent, or Firm* — Conley Rose, P.C.

(57) ABSTRACT

An OLT comprises a processor configured to generate a first message comprising a first field instructing an ONU to report its data rate capability as at least one of 10 Gb/s, 25 Gb/s, or 50 Gb/s; a transmitter coupled to the processor and configured to transmit the first message to the ONU; and a receiver coupled to the processor and configured to receive a second message from the ONU in response to the first message, the second message comprises a second field indicating the data rate capability. A method comprises generating a first message comprising a first field instructing reporting of a data rate capability as at least one of 10 Gb/s, 25 Gb/s, or 50 Gb/s; transmitting the first message; and receiving a second message in response to the first message, the second message comprises a second field indicating the data rate capability.

10 Claims, 10 Drawing Sheets

Related U.S. Application Data

(60) Provisional application No. 62/735,402, filed on Sep. 24, 2018.

(56) References Cited

U.S. PATENT DOCUMENTS

| | | | |
|---|---|---|---|
| 2008/0056721 A1* | 3/2008 | Mori | H04J 3/22 398/100 |
| 2008/0226294 A1* | 9/2008 | Sakai | H04B 10/272 398/63 |
| 2008/0253770 A1* | 10/2008 | Mori | H04Q 11/0067 398/59 |
| 2009/0010650 A1* | 1/2009 | Tsuchiya | H04J 3/0602 398/59 |
| 2009/0162065 A1* | 6/2009 | Mizutani | H04J 3/0655 398/66 |
| 2011/0188859 A1* | 8/2011 | Wen | H04J 14/0282 398/79 |
| 2012/0093500 A1* | 4/2012 | Shiba | H04J 14/0247 398/25 |
| 2014/0126907 A1* | 5/2014 | Hirth | H04Q 11/0062 398/58 |
| 2014/0126910 A1* | 5/2014 | Luo | H04J 14/0235 398/67 |
| 2014/0255027 A1* | 9/2014 | Hood | H04Q 11/0067 398/58 |
| 2015/0050024 A1 | 2/2015 | Luo et al. | |
| 2015/0063805 A1* | 3/2015 | Lamb | H04J 14/08 398/58 |
| 2016/0105253 A1 | 4/2016 | Liu et al. | |
| 2017/0005723 A1* | 1/2017 | Prause | H04B 10/07955 |
| 2018/0035183 A1* | 2/2018 | Kim | H04Q 11/0067 |

FOREIGN PATENT DOCUMENTS

| | | |
|---|---|---|
| CN | 106685591 A | 5/2017 |
| WO | 2014063656 A1 | 5/2014 |

OTHER PUBLICATIONS

"Liaison on Cooperative Dynamic Bandwidth Assignment," 3GPP TSG RAN Meeting #81, Jun. 21, 2018, RP-182091, 5 pages.

Hajduczenia, M., "Discovery Process for Emerging 10 Gb/s EPONs," IEEE Communications Magazine, Nov. 2008, 9 pages, XP11239038A.

ITU-T (Telecommunication Standardization Sector of ITU ), G.989.3, "Series G: Transmission Systems and Media, Digital Systems and Networks; Digital sections and digital line system—Optical line systems for local and access networks; 40-Gigabit-capable passive optical networks (NG-PON2): Transmission convergence layer specification (Amendment 1)," Nov. 2016, 266 pages, XP044259082.

ITU-T (Telecommunication Standardization Sector of ITU ), G.9807.1, "Series G: Transmission Systems and Media, Digital Systems and Networks; Access networks—Optical line systems for local and access networks; 10-Gigabit-capable symmetric passive optical network (XGS-PON) Amendment 1," Oct. 2017, 288 pages, XP44260209A.

* cited by examiner

410 ↓

| Alloc-ID | Upstream Line Rate (Gb/s) |
|---|---|
| 1023 | 2.5 |
| 1022 | 10 |
| 1021 | 2.5/10 |
| 1020 | 25 |
| 1019 | 50 |
| 1018 | 10/12.5/25/50 |

| Alloc-ID | Upstream Line Rate (Gb/s) |
|---|---|
| 1023 | 2.5 |
| 1022 | 10 |
| 1021 | 2.5/10/12.5/25/50 |
| 1020 | 25 |
| 1019 | 50 |

| Alloc-ID | Upstream Line Rate (Gb/s) |
|---|---|
| 1023 | 10 |
| 1022 | 25 |
| 1021 | 50 |
| 1020 | 10/12.5/25/50 |

| Alloc-ID | Upstream Line Rate (Gb/s) |
|---|---|
| 1023 | 10/12.5/25/50 |
| 1022 | 50 |
| 1021 | 25 |
| 1020 | 10 |

FIG. 4D

| Octet | Content | Description | |
|---|---|---|---|
| 1-2 | ONU-ID | 0x03FF, unassigned ONU-ID | — 505 |
| 3 | Message type ID | 0x01, "serial_number_ONU" | — 510 |
| 4 | SeqNo | Set to 0x00 for all instances of serial_number_ONU PLOAM message | — 515 |
| 5-8 | Vendor_ID | See clause 11.2.6.1 | — 520 |
| 9-12 | VSSN | See clause 11.2.6.2 | — 525 |
| 13-16 | Random_delay | The random delay used by the ONU when sending this message, expressed in integer bit periods with respect to the nominal upstream line rate of 2.48832 Gb/s, regardless of the actual upstream line rate of the ONU. | — 530 |
| 17-18 | Correlation tag | Octets are not used for XGS-PON, set as 0x00 by the tx | — 535 |
| 19-22 | Current downstream PON-ID | Octets are not used for XGS-PON, set as 0x00 by the tx | — 540 |
| 23-26 | Current upstream PON-ID | Octets are not used for XGS-PON, set as 0x00 by the tx | — 545 |
| 27-34 | Calibration record status | Octets are not used for XGS-PON, set as 0x00 by the tx | — 550 |
| 35 | Tuning granularity | Octet is not used for XGS-PON, set as 0x00 by the tx | — 555 |
| 36 | Step tuning time | Octet is not used for XGS-PON, set as 0x00 by the tx | — 560 |
| 37 | Line rate capability | A bitmap of the form AB00 CDHL indicating the ONU's nominal line rate capability. A – downstream nominal line rate of 49.7664 Gb/s A = 0: not supported A = 1: supported B – downstream nominal line rate of 24.8832 Gb/s B = 0: not supported B = 1: supported C – upstream nominal line rate of 49.7664 Gb/s C = 0: not supported C = 1: supported D – upstream nominal line rate of 24.8832 Gb/s D = 0: not supported D = 1: supported H – upstream nominal line rate of 9.95328 Gb/s H = 0: not supported H = 1: supported L – upstream nominal rate of 2.48832 Gb/s L = 0: not supported L = 1: supported | — 565 |
| 38 | Attenuation | Octet is not used for XGS-PON, set as 0x00 by the tx | — 570 |
| 39 | Power levelling capability | Octet is not used for XGS-PON, set as 0x00 by the tx | — 575 |
| 40 | Padding | Set to 0x00 by the transmitter; treated as "don't care" by the receiver | — 580 |
| 41-48 | MIC | Message integrity check computed using the default PLOAM integrity key | — 585 |

FIG. 5

MULTIPLE-RATE OPTICAL NETWORK UNIT (ONU) ACTIVATION

CROSS-REFERENCE TO RELATED APPLICATIONS

This claims priority to Int'l Patent App. No. PCT/CN2019/091201 filed on Jun. 14, 2019 by Huawei Technologies Co., Ltd. and titled "Multiple-Rate Optical Network Unit (ONU) Activation," which claims priority to U.S. Prov. Patent App. No. 62/735,402 filed on Sep. 24, 2018 by Futurewei Technologies, Inc. and titled "Multiple-Rate Optical Network Unit (ONU) Activation," which are incorporated by reference.

TECHNICAL FIELD

The disclosed embodiments relate to optical networks in general and power conservation in multiple-rate ONU activation in particular.

BACKGROUND

Optical networks are networks that use light waves, or optical signals, to carry data. Light sources such as lasers generate optical signals; modulators modulate the optical signals with data to generate modulated optical signals; and various components transmit, propagate, amplify, receive, and process the modulated optical signals. Optical networks use multiplexing to achieve high bandwidths. Optical networks implement data centers, metropolitan networks, PONs, longhauls, and other applications.

SUMMARY

In an embodiment, an OLT comprises: a processor configured to generate a first message comprising a first field instructing an ONU to report its data rate capability as at least one of 10 Gb/s, 25 Gb/s, or 50 Gb/s; a transmitter coupled to the processor and configured to transmit the first message to the ONU; and a receiver coupled to the processor and configured to receive a second message from the ONU in response to the first message, the second message comprises a second field indicating the data rate capability.

In an embodiment, a computer program product comprises computer executable instructions stored on a non-transitory medium that when executed by a processor cause an apparatus to: generate a first message comprising a first field instructing reporting of a data rate capability as at least one of 10 Gb/s, 25 Gb/s, or 50 Gb/s; transmit the first message; and receive a second message in response to the first message, the second message comprises a second field indicating the data rate capability.

In an embodiment, a method is performed by an OLT, and the method comprises: generating a first message comprising a first field instructing reporting of a data rate capability as at least one of 10 Gb/s, 25 Gb/s, or 50 Gb/s; transmitting the first message; and receiving a second message in response to the first message, the second message comprises a second field indicating the data rate capability.

In any of the preceding embodiments, the first message is an SN grant message.

In any of the preceding embodiments, the first field is in an Alloc-ID field.

In any of the preceding embodiments, the second message is an SN ONU message.

In any of the preceding embodiments, the second field is a line rate capability field.

In any of the preceding embodiments, the second field further indicates a downstream nominal line rate of 49.7664 Gb/s.

In any of the preceding embodiments, the second field further indicates a downstream nominal line rate of 24.8832 Gb/s.

In any of the preceding embodiments, the second field further indicates an upstream nominal line rate of 49.7664 Gb/s.

In any of the preceding embodiments, the second field further indicates an upstream nominal line rate of 24.8832 Gb/s.

In an embodiment, an ONU comprises: a receiver configured to receive a first message from an OLT, the first message comprises a first field instructing the ONU to report its data rate capability as at least one of 10 Gb/s, 25 Gb/s, or 50 Gb/s; a processor coupled to the receiver and configured to generate a second message in response to the first message, the second message comprises a second field indicating the data rate capability; and a transmitter coupled to the processor and configured to transmit the second message to the OLT.

In an embodiment, a computer program product comprises computer executable instructions stored on a non-transitory medium that when executed by a processor cause an apparatus to: receive a first message comprising a first field instructing reporting of a data rate capability as at least one of 10 Gb/s, 25 Gb/s, or 50 Gb/s; generate a second message in response to the first message, the second message comprises a second field indicating the data rate capability; and transmit the second message.

In an embodiment, a method is performed by an ONU, and the method comprises: receiving a first message comprising a first field instructing reporting of a data rate capability as at least one of 10 Gb/s, 25 Gb/s, or 50 Gb/s; generating a second message in response to the first message, the second message comprises a second field indicating the data rate capability; and transmitting the second message.

In any of the preceding embodiments, the first message is an SN grant message from an OLT.

In any of the preceding embodiments, the first field is in an Alloc-ID field.

In any of the preceding embodiments, the second message is an SN ONU message to an OLT.

In any of the preceding embodiments, the second field is a line rate capability field.

In any of the preceding embodiments, the second field further indicates a downstream nominal line rate of 49.7664 Gb/s.

In any of the preceding embodiments, the second field further indicates a downstream nominal line rate of 24.8832 Gb/s.

In any of the preceding embodiments, the second field further indicates an upstream nominal line rate of 49.7664 Gb/s.

In any of the preceding embodiments, the second field further indicates an upstream nominal line rate of 24.8832 Gb/s.

In an embodiment, an OLT comprises: a processor configured to generate an SN grant message comprising an Alloc-ID field, the Alloc-ID field comprises a first value indicating quiet windows for ONUs with upstream line rates of 10 Gb/s, 25 Gb/s, or 50 Gb/s; a transmitter coupled to the processor and configured to transmit the SN grant message to the ONUs; and a receiver coupled to the processor and configured to receive a serial_number_ONU message from a first ONU in response to the SN grant message, the serial_number_ONU message comprises a line rate capability field, the line rate capability field comprises a second value indicating what nominal line rates the first ONU supports, and the first ONU is one of the ONUs.

In an embodiment, a computer program product comprises computer executable instructions stored on a non-transitory medium that when executed by a processor cause an OLT to: generate an SN grant message comprising an Alloc-ID field, the Alloc-ID field comprises a first value indicating quiet windows for ONUs with upstream line rates of 10 Gb/s, 25 Gb/s, or 50 Gb/s; transmit the SN grant message to the ONUs; and receive a serial_number_ONU message from a first ONU in response to the SN grant message, the serial_number_ONU message comprises a line rate capability field, the line rate capability field comprises a second value indicating what nominal line rates the first ONU supports, and the first ONU is one of the ONUs.

In an embodiment, a method implemented by an OLT, the method comprises: generating an SN grant message comprising an Alloc-ID field, the Alloc-ID field comprises a first value indicating quiet windows for ONUs with upstream line rates of 10 Gb/s, 25 Gb/s, or 50 Gb/s; transmitting the SN grant message to the ONUs; and receiving a serial_number_ONU message from a first ONU in response to the SN grant message, the serial_number_ONU message comprises a line rate capability field, the line rate capability field comprises a second value indicating what nominal line rates the first ONU supports, and the first ONU is one of the ONUs.

In any of the preceding embodiments, the Alloc-ID field further comprises: a value of 1023 to indicate quiet windows for the ONUs with upstream line rates of 2.5 Gb/s; a value of 1022 to indicate quiet windows for the ONUs with upstream line rates of 10 Gb/s; a value of 1021 to indicate quiet windows for the ONUs with upstream line rates of 2.5 Gb/s or 10 Gb/s; a value of 1020 to indicate quiet windows for the ONUs with upstream line rates of 25 Gb/s; a value of 1019 to indicate quiet windows for the ONUs with upstream line rates of 50 Gb/s; or a value of 1018 to indicate quiet windows for the ONUs with upstream line rates of 10 Gb/s, 25 Gb/s, or 50 Gb/s.

In any of the preceding embodiments, the Alloc-ID field further comprises: a value of 1023 to indicate quiet windows for the ONUs with upstream line rates of 2.5 Gb/s; a value of 1022 to indicate quiet windows for the ONUs with upstream line rates of 10 Gb/s; a value of 1021 to indicate quiet windows for the ONUs with upstream line rates of 2.5 Gb/s, 10 Gb/s, 25 Gb/s, or 50 Gb/s; a value of 1020 to indicate quiet windows for the ONUs with upstream line rates of 25 Gb/s; or a value of 1019 to indicate quiet windows for the ONUs with upstream line rates of 50 Gb/s.

In any of the preceding embodiments, the Alloc-ID field further comprises: a value of 1023 to indicate quiet windows for the ONUs with upstream line rates of 10 Gb/s; a value of 1022 to indicate quiet windows for the ONUs with upstream line rates of 25 Gb/s; a value of 1021 to indicate quiet windows for the ONUs with upstream line rates of 50 Gb/s; or a value of 1020 to indicate quiet windows for the ONUs with upstream line rates of 10 Gb/s, 25 Gb/s, or 50 Gb/s.

In any of the preceding embodiments, the Alloc-ID field further comprises: a value of 1023 to indicate quiet windows for the ONUs with upstream line rates of 10 Gb/s, 25 Gb/s, or 50 Gb/s; a value of 1022 to indicate quiet windows for the ONUs with upstream line rates of 50 Gb/s; a value of 1021 to indicate quiet windows for the ONUs with upstream line rates of 25 Gb/s; or a value of 1020 to indicate quiet windows for the ONUs with upstream line rates of 10 Gb/s.

In any of the preceding embodiments, the line rate capability field comprises: a first bit indicating whether the first ONU supports a downstream nominal line rate of 49.7664 Gb/s; a second bit indicating whether the first ONU supports a downstream nominal line rate of 24.8832 Gb/s; a third bit indicating whether the first ONU supports an upstream nominal line rate of 49.7664 Gb/s; and a fourth bit indicating whether the first ONU supports an upstream nominal line rate of 24.8832 Gb/s.

In an embodiment, a first ONU comprises: a receiver configured to receive an SN grant message from an OLT, the SN grant message comprises an Alloc-ID field, and the Alloc-ID field comprises a first value indicating quiet windows for ONUs with upstream line rates of 10 Gb/s, 25 Gb/s, or 50 Gb/s, the first ONU is one of the ONUs; a processor coupled to the receiver and configured to generate a serial_number_ONU message in response to the SN grant message, the serial_number_ONU message comprises a line rate capability field, and the line rate capability field comprises a second value indicating what nominal line rates the first ONU supports; and a transmitter coupled to the processor and configured to transmit the serial_number_ONU message to the OLT.

In an embodiment, a computer program product comprises computer executable instructions stored on a non-transitory medium that when executed by a processor cause a first ONU to: receive an SN grant message from an OLT, the SN grant message comprises an Alloc-ID field, and the Alloc-ID field comprises a first value indicating quiet windows for ONUs with upstream line rates of 10 Gb/s, 25 Gb/s, or 50 Gb/s, the first ONU is one of the ONUs; generate a serial_number_ONU message in response to the SN grant message, the serial_number_ONU message comprises a line rate capability field, and the line rate capability field comprises a second value indicating what nominal line rates the first ONU supports; and transmit the serial_number_ONU message to the OLT.

In an embodiment, a method implemented by a first ONU, the method comprises: receiving an SN grant message from an OLT, the SN grant message comprises an Alloc-ID field, and the Alloc-ID field comprises a first value indicating quiet windows for ONUs with upstream line rates of 10 Gb/s, 25 Gb/s, or 50 Gb/s, the first ONU is one of the ONUs; generating a serial_number_ONU message in response to the SN grant message, the serial_number_ONU message comprises a line rate capability field, and the line rate capability field comprises a second value indicating what nominal line rates the first ONU supports; and transmitting the serial_number_ONU message to the OLT.

In any of the preceding embodiments, the Alloc-ID field further comprises: a value of 1023 to indicate quiet windows for the ONUs with upstream line rates of 2.5 Gb/s; a value of 1022 to indicate quiet windows for the ONUs with upstream line rates of 10 Gb/s; a value of 1021 to indicate quiet windows for the ONUs with upstream line rates of 2.5 Gb/s or 10 Gb/s; a value of 1020 to indicate quiet windows for the ONUs with upstream line rates of 25 Gb/s; a value of 1019 to indicate quiet windows for the ONUs with upstream line rates of 50 Gb/s; or a value of 1018 to indicate quiet windows for the ONUs with upstream line rates of 10 Gb/s, 25 Gb/s, or 50 Gb/s.

In any of the preceding embodiments, the Alloc-ID field further comprises: a value of 1023 to indicate quiet windows for the ONUs with upstream line rates of 2.5 Gb/s; a value of 1022 to indicate quiet windows for the ONUs with upstream line rates of 10 Gb/s; a value of 1021 to indicate quiet windows for the ONUs with upstream line rates of 2.5 Gb/s, 10 Gb/s, 25 Gb/s, or 50 Gb/s; a value of 1020 to indicate quiet windows for the ONUs with upstream line rates of 25 Gb/s; or a value of 1019 to indicate quiet windows for the ONUs with upstream line rates of 50 Gb/s.

In any of the preceding embodiments, the Alloc-ID field further comprises: a value of 1023 to indicate quiet windows for the ONUs with upstream line rates of 10 Gb/s; a value of 1022 to indicate quiet windows for the ONUs with upstream line rates of 25 Gb/s; a value of 1021 to indicate quiet windows for the ONUs with upstream line rates of 50 Gb/s; or a value of 1020 to indicate quiet windows for the ONUs with upstream line rates of 10 Gb/s, 25 Gb/s, or 50 Gb/s.

In any of the preceding embodiments, the Alloc-ID field further comprises: a value of 1023 to indicate quiet windows for the ONUs with upstream line rates of 10 Gb/s, 25 Gb/s, or 50 Gb/s; a value of 1022 to indicate quiet windows for the ONUs with upstream line rates of 50 Gb/s; a value of 1021 to indicate quiet windows for the ONUs with upstream line rates of 25 Gb/s; or a value of 1020 to indicate quiet windows for the ONUs with upstream line rates of 10 Gb/s.

In any of the preceding embodiments, wherein the line rate capability field comprises: a first bit indicating whether the first ONU supports a downstream nominal line rate of 49.7664 Gb/s; a second bit indicating whether the first ONU supports a downstream nominal line rate of 24.8832 Gb/s; a third bit indicating whether the first ONU supports an upstream nominal line rate of 49.7664 Gb/s; and a fourth bit indicating whether the first ONU supports an upstream nominal line rate of 24.8832 Gb/s.

Any of the above embodiments may be combined with any of the other above embodiments to create a new embodiment. These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 4A is a table of values for the Alloc-ID field in FIG. 3 according to a first embodiment of the disclosure.

FIG. 4B is a table of values for the Alloc-ID field in FIG. 3 according to a second embodiment of the disclosure.

FIG. 4C is a table of values for the Alloc-ID field in FIG. 3 according to a third embodiment of the disclosure.

FIG. 4D is a table of values for the Alloc-ID field in FIG. 3 according to a fourth embodiment of the disclosure.

FIG. 5 is a schematic diagram of a serial_number_ONU message according to an embodiment of the disclosure.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following abbreviations apply:

Alloc-ID: allocation ID
ANSI: American National Standards Institute
ASCII: American Standard Code for Information Interchange
ASIC: application-specific integrated circuit
ATIS: Alliance for Telecommunications Industry Solutions
BCH: Bose-Chaudhuri-Hocquenghem
BWmap: bandwidth map
CO: central office
CPU: central processing unit
DBRu: dynamic bandwidth report, upstream
DSP: digital signal processor
EO: electrical-to-optical
FPGA: field-programmable gate array
FWI: forced wake-up indication
Gbit/s, Gb/s: gigabit(s) per second
HEC: hybrid error correction
ID: identifier
ITU-T: International Telecommunication Union Telecommunication Standardization Section
MIC: message integrity check
MSB: most significant bit(s)
ODN: optical distribution network
OE: optical-to-electrical
OLT: optical line terminal
ONT: optical network terminal
ONU: optical network unit
PLOAM: physical layer operations, administration, and maintenance
PLOAMu: PLOAM, upstream
PON: passive optical network
P2MP: point-to-multipoint
RAM: random-access memory
RE: reach extender
RF: radio frequency
ROM: read-only memory
RX: receiver, receiver unit
SeqNo: sequence number
SN: serial number
SRAM: static RAM
TCAM: ternary content-addressable memory
TX: transmitter, transmitter unit
VS SN: vendor-specific SN.

Figure 1:
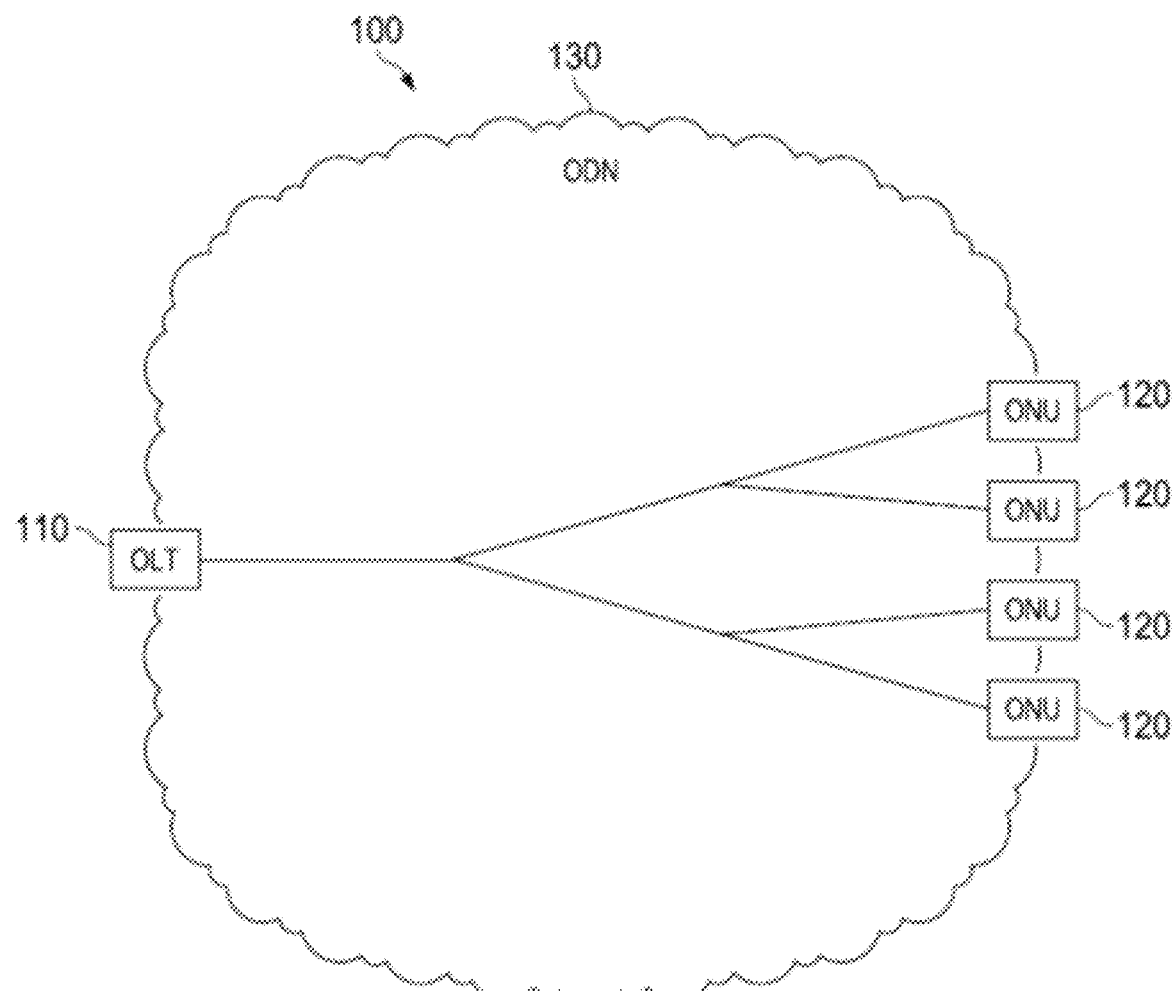
FIG. 1 is a schematic diagram of a PON.

FIG. 1 is a schematic diagram of a PON 100. The PON 100 comprises an OLT 110, ONUs 120, and an ODN 130 that couples the OLT 110 to the ONUs 120. The PON 100 is a communications network that may not require active components to distribute data between the OLT 110 and the ONUs 120. Instead, the PON 100 may use passive optical components in the ODN 130 to distribute data between the OLT 110 and the ONUs 120.

The OLT 110 communicates with another network and the ONUs 120. Specifically, the OLT 110 is an intermediary between the other network and the ONUs 120. For instance, the OLT 110 forwards data received from the other network to the ONUs 120 and forwards data received from the ONUs 120 to the other network. The OLT 110 comprises a transmitter and a receiver. When the other network uses a network protocol that is different from the protocol used in the PON 100, the OLT 110 comprises a converter that converts the network protocol to the PON protocol and vice versa. The OLT 110 is typically located at a central location such as a CO, but it may also be located at other suitable locations.

The ODN 130 is a data distribution network that comprises optical fiber cables, couplers, splitters, distributors, and other suitable components. The components include passive optical components that do not require power to distribute signals between the OLT 110 and the ONUs 120. Alternatively, the components include active components such as optical amplifiers that do require power. The ODN 130 extends from the OLT 110 to the ONUs 120 in a branching configuration as shown, but the ODN 130 may be configured in any other suitable P2MP configuration.

The ONUs 120 communicate with the OLT 110 and customers and act as intermediaries between the OLT 110 and the customers. For instance, the ONUs 120 forward data from the OLT 110 to the customers and forward data from the customers to the OLT 110. The ONUs 120 comprise optical transceivers that receive optical signals from the OLT 110, convert the optical signals into electrical signals, and provide the electrical signals to the customers. The transceivers also receive electrical signals from the customers, convert the electrical signals into optical signals, and transmit the optical signals to the OLT 110. ONUs 120 and ONTs are similar, and the terms may be used interchangeably. The ONUs 120 are typically located at distributed locations such as customer premises, but they may also be located at other suitable locations.

Previously, the ONUs 120 communicated at a 10 Gb/s rate. The rates may be line rates or data rates. In the future, the ONUs 120 will also communicate at 12.5 Gb/s, 25 Gb/s, 50 Gb/s, and higher rates. There is therefore a desire to accommodate ONU 120 activation at those new rates.

Disclosed herein are embodiments for multiple-rate ONU activation. The embodiments comprise messages from an OLT to ONUs that instruct the ONUs to report their data rate capability, or the messages indicate quiet windows for the ONUs with upstream line rates of various values. The embodiments further comprise messages from the ONUs to the OLT that indicate data rate capabilities of the ONUs 120, or the messages indicate what nominal line rates the ONUs support. The rates may include 12.5 Gb/s, 25 Gb/s, and 50 Gb/s. ONU activation may include or be described as ONU registration.

Figure 2:
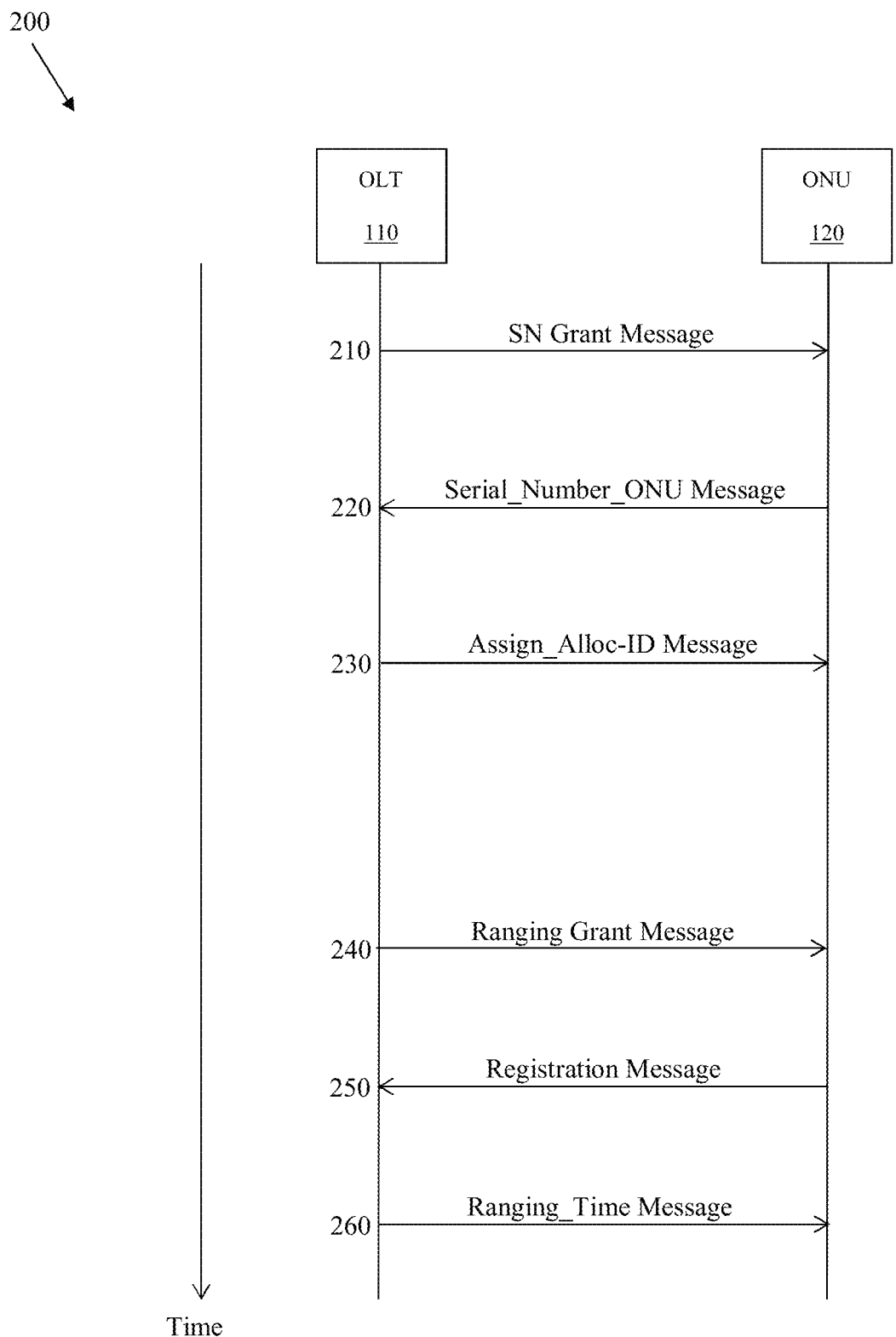
FIG. 2 is a message sequence diagram illustrating ONU activation.

FIG. 2 is a message sequence diagram 200 illustrating ONU activation. At step 210, the OLT 110 transmits an SN grant message to the ONUs 120. The SN grant message comprises a BWmap format and indicates an allocation to one of the specified broadcast Alloc-IDs with a known burst profile, specific start time, and PLOAMu flag set. The SN grant message also indicates various quiet windows for ONUs 120 that are transmitting at various rates and thus may instruct the ONUs 120 to report their rates (FIGS. 3-4D further describe the SN grant message and its fields). At step 220, an ONU 120 transmits a serial_number_ONU message to the OLT 110. The serial_number_ONU message comprises a PLOAM format. The serial_number_ONU message reports a serial number of an activating ONU 120 and reports a rate or rates of the activating ONU 120 (FIG. 5 further describes the serial_number_ONU message). At step 230, the OLT 110 transmits an assign ONU ID message to the ONU 120. The assign ONU ID message comprises a PLOAM format and assigns a specified Alloc-ID to a particular ONU 120 or cancels a previously executed Alloc-ID assignment. Steps 210-230 form a serial number assignment portion of the ONU 120 activation.

At step 240, the OLT 110 transmits a ranging grant message to the ONU 120. The ranging grant message comprises a BWmap format and indicates an allocation to one of the ONU's 120 Alloc-IDs with a known burst profile and with a known PLOAMu flag set. At step 250, the ONU 120 transmits a registration message to the OLT 110. The registration message comprises a PLOAM format and reports the serial number of the activating ONU 120. Finally, at step 260, the OLT 110 transmits a ranging_time message to the ONU 120. The ranging_time message comprises a PLOAM format and indicates a round-trip equalization delay. Steps 240-260 form a ranging portion of the ONU activation.

Figure 3:
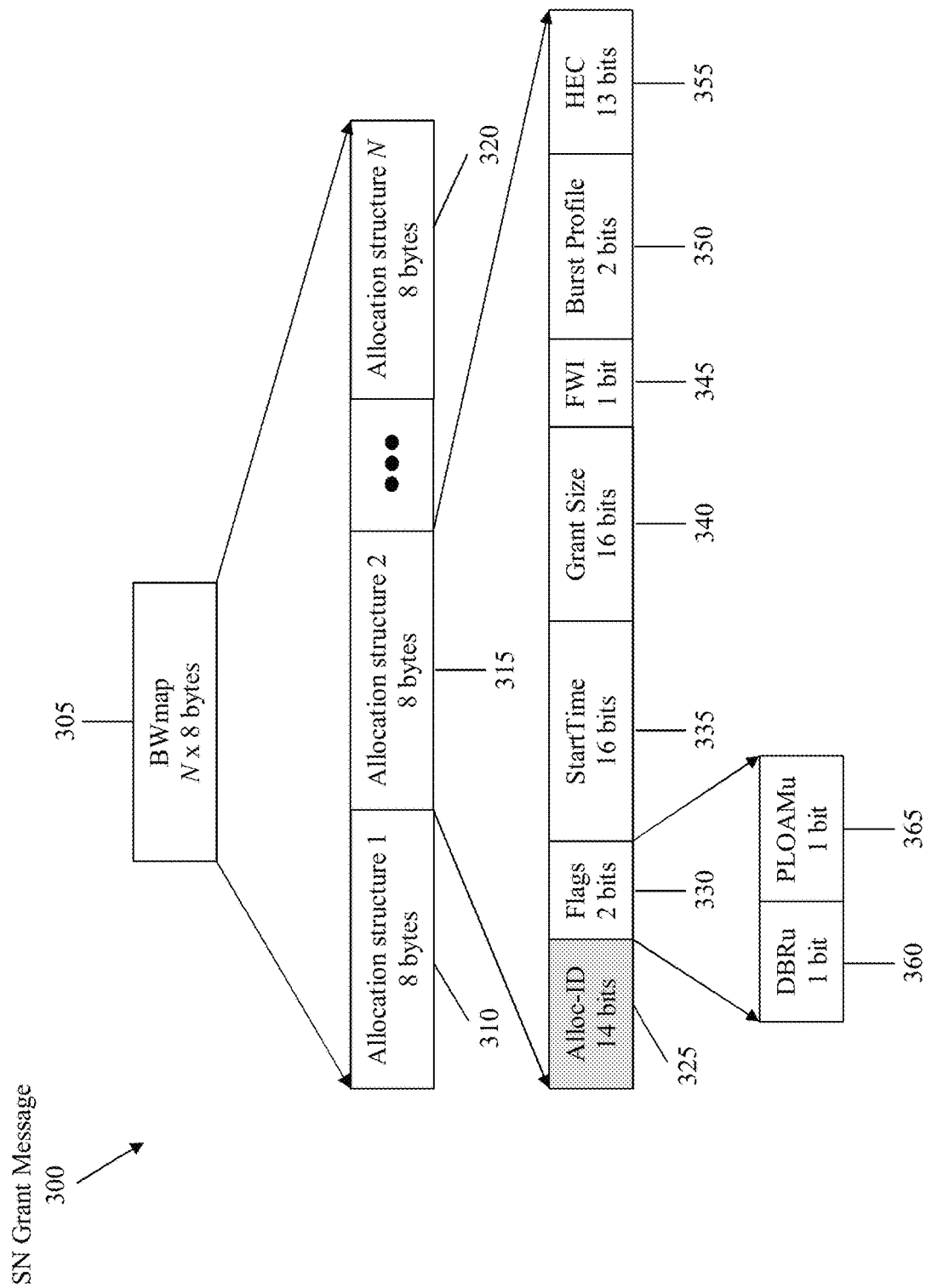
FIG. 3 is a schematic diagram of an SN grant message.

FIG. 3 is a schematic diagram of an SN grant message 300. The SN grant message 300 is the SN grant message at step 210 in FIG. 2. The SN grant message 300 comprises a BWmap field 305 of N×8 bytes. N is a positive integer. The BWmap field 305 comprises allocation structure fields 1-N 310-320 of 8 bytes each.

Each allocation structure field 310-320 comprises an Alloc-ID field 325 of 14 bits, a flags field 330 of 2 bits, a StartTime field 335 of 16 bits, a grant size field 340 of 16 bits, an FWI field 345 of 1 bit, a burst profile field 350 of 2 bits, and an HEC field 355 of 13 bits. The Alloc-ID field 325 indicates a recipient of a bandwidth allocation. The flags field 330 comprises a DBRu field 360 of 1 bit and a PLOAMu field 365 of 1 bit. The DBRu field 360 indicates whether the ONU 120 should send a DBRu report. The PLOAMu field 365 indicates a size of an upstream framing sublayer burst header. The StartTime field 335 indicates a location of a first byte of an upstream framing sublayer burst. The grant size field 340 indicates a combined length of a framing sublayer payload data with DBRu overhead transmitted within a given allocation. The FWI field 345 expedites waking up an ONU 120 that has been saving power. The burst profile field 350 contains an index of a burst profile to be used by a physical layer adaptation sublayer of the ONU 120 to form a physical layer burst. The HEC field 355 is a combination of a BCH code and a parity bit.

FIG. 4A is a table 410 of values for the Alloc-ID field 325 in FIG. 3 according to a first embodiment of the disclosure. A value of 1023 indicates quiet windows for ONUs 120 with upstream line rates of 2.5 Gb/s; a value of 1022 indicates quiet windows for ONUs 120 with upstream line rates of 10 Gb/s; a value of 1021 indicates quiet windows for ONUs 120 with upstream line rates of 2.5 Gb/s or 10 Gb/s; a value of 1020 indicates quiet windows for ONUs 120 with upstream line rates of 25 Gb/s; a value of 1019 indicates quiet windows for ONUs 120 with upstream line rates of 50 Gb/s;

and a value of 1018 indicates quiet windows for ONUs 120 with upstream line rates of 10 Gb/s, 12.5 Gb/s, 25 Gb/s, or 50 Gb/s. Another value may indicate quiet windows for ONUs 120 with upstream line rates of 12.5 Gb/s.

FIG. 4B is a table 420 of values for the Alloc-ID field 325 in FIG. 3 according to a second embodiment of the disclosure. A value of 1023 indicates quiet windows for ONUs 120 with upstream line rates of 2.5 Gb/s; a value of 1022 indicates quiet windows for ONUs 120 with upstream line rates of 10 Gb/s; a value of 1021 indicates quiet windows for ONUs 120 with upstream line rates of 2.5 Gb/s, 10 Gb/s, 12.5 Gb/s, 25 Gb/s, or 50 Gb/s; a value of 1020 indicates quiet windows for ONUs 120 with upstream line rates of 25 Gb/s; and a value of 1019 indicates quiet windows for ONUs 120 with upstream line rates of 50 Gb/s. Another value may indicate quiet windows for ONUs 120 with upstream line rates of 12.5 Gb/s.

FIG. 4C is a table 430 of values for the Alloc-ID field 325 in FIG. 3 according to a third embodiment of the disclosure. A value of 1023 indicates quiet windows for ONUs 120 with upstream line rates of 10 Gb/s; a value of 1022 indicates quiet windows for ONUs 120 with upstream line rates of 25 Gb/s; a value of 1021 indicates quiet windows for ONUs 120 with upstream line rates of 50 Gb/s; and a value of 1020 indicates quiet windows for ONUs 120 with upstream line rates of 10 Gb/s, 12.5 Gb/s, 25 Gb/s, or 50 Gb/s. Another value may indicate quiet windows for ONUs 120 with upstream line rates of 12.5 Gb/s.

FIG. 4D is a table 440 of values for the Alloc-ID field 325 in FIG. 3 according to a fourth embodiment of the disclosure. A value of 1023 indicates quiet windows for ONUs 120 with upstream line rates of 10 Gb/s, 12.5 Gb/s, 25 Gb/s, or 50 Gb/s; a value of 1022 indicates quiet windows for ONUs 120 with upstream line rates of 50 Gb/s; a value of 1021 indicates quiet windows for ONUs 120 with upstream line rates of 25 Gb/s; and a value of 1020 indicates quiet windows for ONUs 120 with upstream line rates of 10 Gb/s. Another value may indicate quiet windows for ONUs 120 with upstream line rates of 12.5 Gb/s.

FIG. 5 is a schematic diagram of a serial_number_ONU message 500 according to an embodiment of the disclosure. The serial_number_ONU message 500 is the serial_number_ONU message at step 220 in FIG. 2. The serial_number_ONU message 500 comprises an ONU-ID field 505 in octets 1-2, a message type ID field 510 in octet 3, a SeqNo field 515 in octet 4, a vendor_ID field 520 in octets 5-8, a VSSN field 525 in octets 9-12, a random_delay field 530 in octets 13-16, a correlation tag field 535 in octets 17-18, a current downstream PON-ID field 540 in octets 19-22, a current upstream PON-ID field 545 in octets 23-26, a calibration record status field 550 in octets 27-34, a tuning granularity field 555 in octet 35, a step tuning time field 560 in octet 36, a line rate capability field 565 in octet 37, an attenuation field 570 in octet 38, a power levelling capability field 575 in octet 39, a padding field 580 in octet 40, and an MIC field 585 in octets 41-48.

The descriptions of the fields 505-585 are shown in FIG. 5. For the vendor_ID field 520, the description indicates "See clause 11.2.6.1." Clause 11.2.6.1 is in "Series G: Transmission Systems and Media, Digital Systems and Networks," ITU-T G.9807.1 Amendment 1, October 2017 ("G.9807.1"), and provides the following:

Vendor_ID is the first of the two components of the ONU serial number, which ONU reports to the OLT in the course of activation, and which the OLT stores and subsequently uses to address the ONU when the ONU-ID is not yet available or is considered unreliable. The code set for the Vendor_ID is specified in [ATIS-0300220].

The four characters are mapped into the 4-byte field by taking each ASCII/ANSI character code and concatenating them. For example, Vendor_ID=ABCD fills the four octets of the PLOAM message format element as follows:

| Character | Octet | Value |
|---|---|---|
| A | 1 | 0 × 41 |
| B | 2 | 0 × 42 |
| C | 3 | 0 × 43 |
| D | 4 | 0 × 44 |

In case of an RE embedded ONU, the Vendor_ID should be the ordinary SN plus 0x80 00 00 00. Note that the 4 MSB are the ASCII coded alphanumeric label of the vendor. In this formatting, those characters of ordinary SN consume code points from 65 to 90, while the leading bit of each byte is unused.

For the VSSN field 525, the description indicates "See clause 11.2.6.2." Clause 11.2.6.2 is in G.9807.1 and provides the following:

VSSN is the second of the two components of the ONU serial number, which ONU reports to the OLT in the course of activation, and which the OLT uses to address the ONU when the ONU-ID is unavailable or unreliable.

VSSN is a four-byte unsigned integer, selected by the ONU vendor.

The line rate capability field 565 is a bitmap of the form AB00 CDHL, indicating the ONU's 120 nominal line rate capability. If the A bit is 0, then the ONU 120 does not support a downstream nominal line rate of 49.7664 Gb/s; if the A bit is 1, then the ONU 120 does support a downstream nominal line rate of 49.7664 Gb/s. If the B bit is 0, then the ONU 120 does not support a downstream nominal line rate of 24.8832 Gb/s; if the B bit is 1, then the ONU 120 does support a downstream nominal line rate of 24.8832 Gb/s. If the C bit is 0, then the ONU 120 does not support an upstream nominal line rate of 49.7664 Gb/s; if the C bit is 1, then the ONU 120 does support an upstream nominal line rate of 49.7664 Gb/s. If the D bit is 0, then the ONU 120 does not support an upstream nominal line rate of 24.8832 Gb/s; if the D bit is 1, then the ONU 120 does support an upstream nominal line rate of 24.8832 Gb/s. If the H bit is 0, then the ONU 120 does not support an upstream nominal line rate of 9.95328 Gb/s; if the H bit is 1, then the ONU 120 does support an upstream nominal line rate of 9.95328 Gb/s. If the L bit is 0, then the ONU 120 does not support an upstream nominal line rate of 2.48832 Gb/s; if the L bit is 1, then the ONU 120 does support an upstream nominal line rate of 2.48832 Gb/s. Other bits and values may indicate whether the ONU 120 supports a downstream nominal line rate of 12.4416 Gb/s or whether the ONU 120 supports an upstream nominal line rate of 12.4416 Gb/s.

Though messages are given specific names, those messages may comprise similar content, but have different names. Similarly, though fields of those messages are given specific names, those fields may comprise similar content, but have different names. Within the messages, the fields may be in any suitable order and comprise any suitable number of bits. Finally, though rates are given specific values, those rates may be change depending on the PON 100. For instance, the PON 100 may implement rates of 12.5 Gb/s or rates higher than 50 Gb/s in the future.

Figure 6:
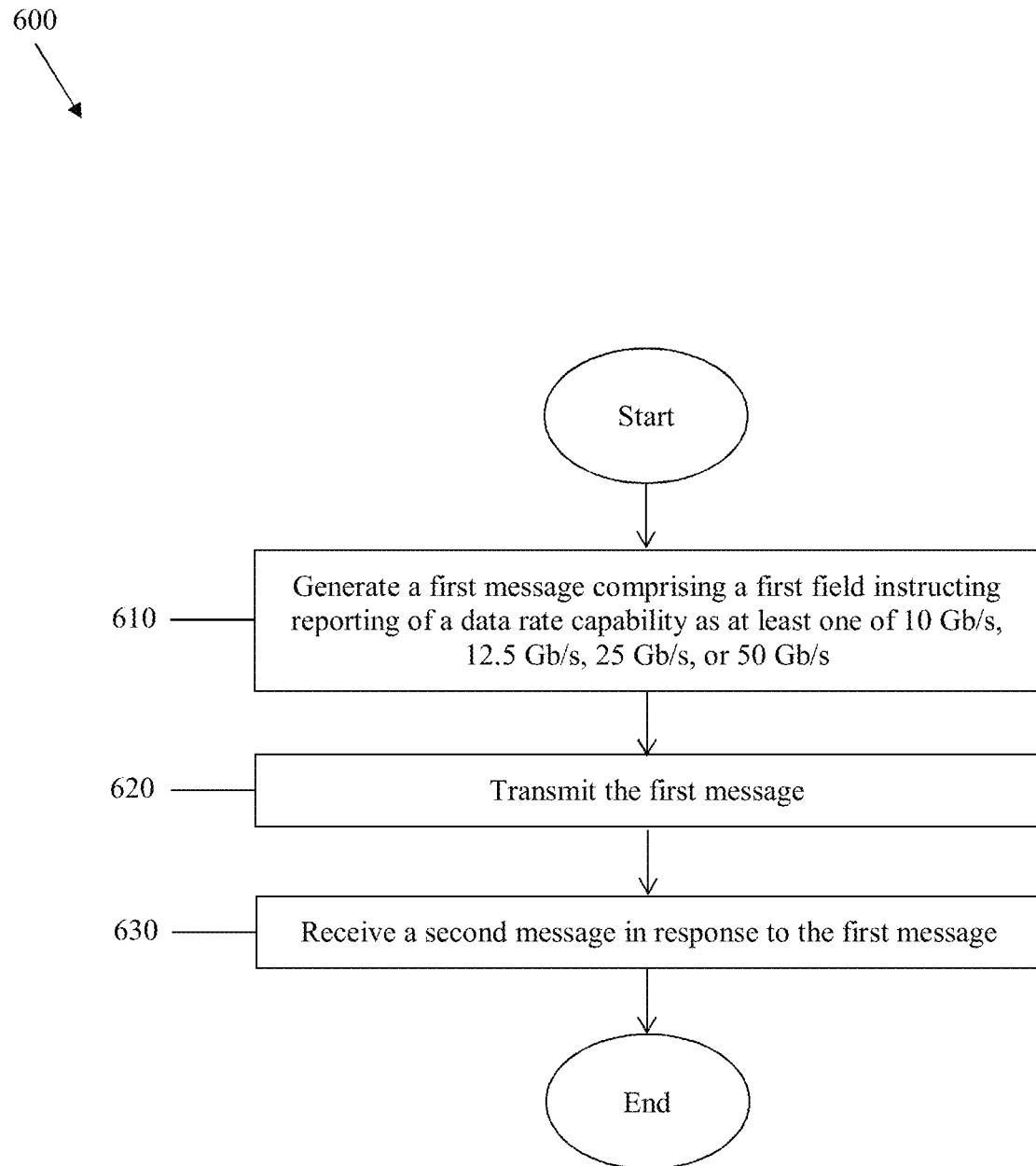
FIG. 6 is a flowchart illustrating a method of multiple-rate ONU activation according to a first embodiment of the disclosure.

FIG. 6 is a flowchart illustrating a method 600 of multiple-rate ONU activation according to a first embodiment of the disclosure. The OLT 110 may perform the method 600. At step 610, a first message comprising a first field instructing reporting of a data rate capability as at least one of 10 Gb/s, 12.5 Gb/s, 25 Gb/s, or 50 Gb/s is generated. For instance, the first message is the SN grant message 300 and the first field is the Alloc-ID field 325 in FIG. 3. At step 620, the first message is transmitted. For instance, the OLT 110 transmits the first message to the ONUs 120. Finally, at step 630, a second message is received in response to the first message. The second message comprises a second field indicating the data rate capability. For instance, the second message is the serial_number_ONU message 500 and the second field is the line rate capability field 565 in FIG. 5.

Figure 7:
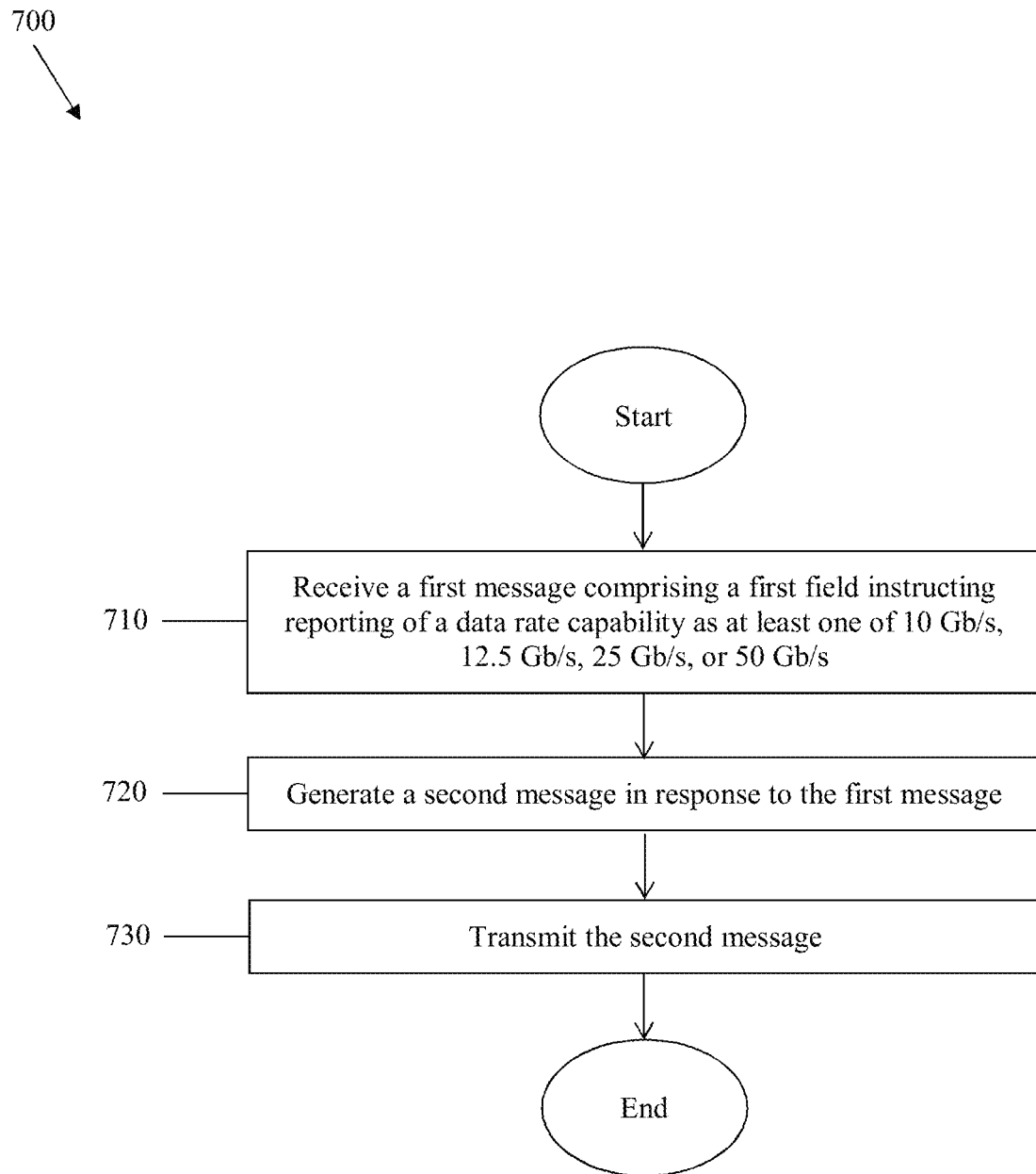
FIG. 7 is a flowchart illustrating a method of multiple-rate ONU activation according to a second embodiment of the disclosure.

FIG. 7 is a flowchart illustrating a method 700 of multiple-rate ONU activation according to a second embodiment of the disclosure. An ONU 120 may perform the method 700. At step 710, a first message comprising a first field instructing reporting of a data rate capability as at least one of 10 Gb/s, 12.5 Gb/s, 25 Gb/s, or 50 Gb/s is received. For instance, the first message is the SN grant message 300 and the first field is the Alloc-ID field 325 in FIG. 3. At step 720, a second message is generated in response to the first message. The second message comprises a second field indicating the data rate capability. For instance, the second message is the serial_number_ONU message 500 and the second field is the line rate capability field 565 in FIG. 5. Finally, at step 730, the second message is transmitted. For instance, the ONU 120 transmits the second message to the OLT 110.

Figure 8:
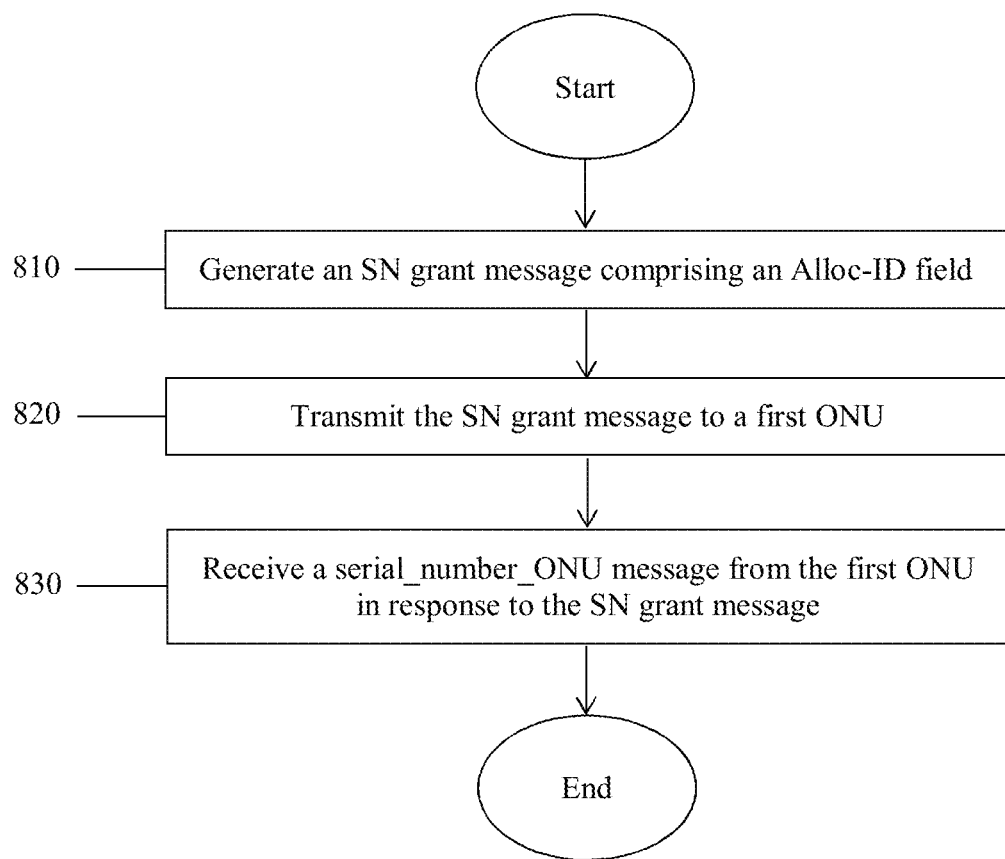
FIG. 8 is a flowchart illustrating a method of multiple-rate ONU activation according to a third embodiment of the disclosure.

FIG. 8 is a flowchart illustrating a method 800 of multiple-rate ONU activation according to a third embodiment of the disclosure. The OLT 110 may perform the method 800. At step 810, an SN grant message comprising an Alloc-ID field is generated. The Alloc-ID field comprises a first value indicating quiet windows for ONUs with upstream line rates of 10 Gb/s, 12.5 Gb/s, 25 Gb/s, or 50 Gb/s. For instance, the SN grant message is the SN grant message 300 and the Alloc-ID field is the Alloc-ID field 325 in FIG. 3. At step 820, the SN grant message is transmitted to the ONUs. For instance, the ONUs are the ONUs 120. Finally, at step 830, a serial_number_ONU message is received from a first ONU in response to the SN grant message. The serial_number_ONU message comprises a line rate capability field, the line rate capability field comprises a second value indicating what nominal line rates the first ONU supports, and the first ONU is one of the ONUs. For instance, the serial_number_ONU message is the serial_number_ONU message 500 and the line rate capability field is the line rate capability field 565 in FIG. 5.

Figure 9:
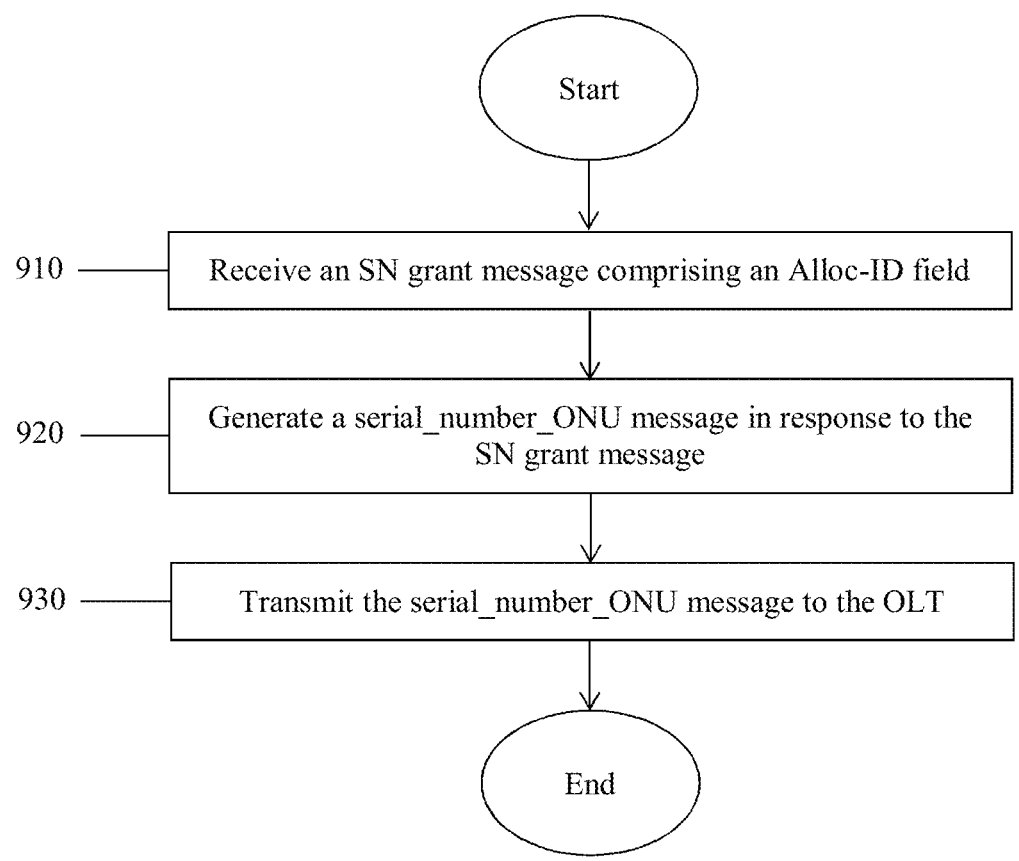
FIG. 9 is a flowchart illustrating a method of multiple-rate ONU activation according to a fourth embodiment of the disclosure.

FIG. 9 is a flowchart illustrating a method 900 of multiple-rate ONU activation according to a fourth embodiment of the disclosure. An ONU 120 may perform the method 900. At step 910, an SN grant message is received from an OLT. The SN grant message comprises an Alloc-ID field, and the Alloc-ID field comprises a first value indicating quiet windows for ONUs with upstream line rates of 10 Gb/s, 12.5 Gb/s, 25 Gb/s, or 50 Gb/s. For instance, the SN grant message is the SN grant message 300 and the Alloc-ID field is the Alloc-ID field 325 in FIG. 3, and the OLT is the OLT 110. At step 920, a serial_number_ONU message is generated in response to the SN grant message. The serial_number_ONU message comprises a line rate capability field, and the line rate capability field comprises a second value indicating what nominal line rates the first ONU supports. For instance, the serial_number_ONU message is the serial_number_ONU message 500 and the line rate capability field is the line rate capability field 565 in FIG. 5. Finally, at step 930, the serial_number_ONU message is transmitted to the OLT.

Figure 10:
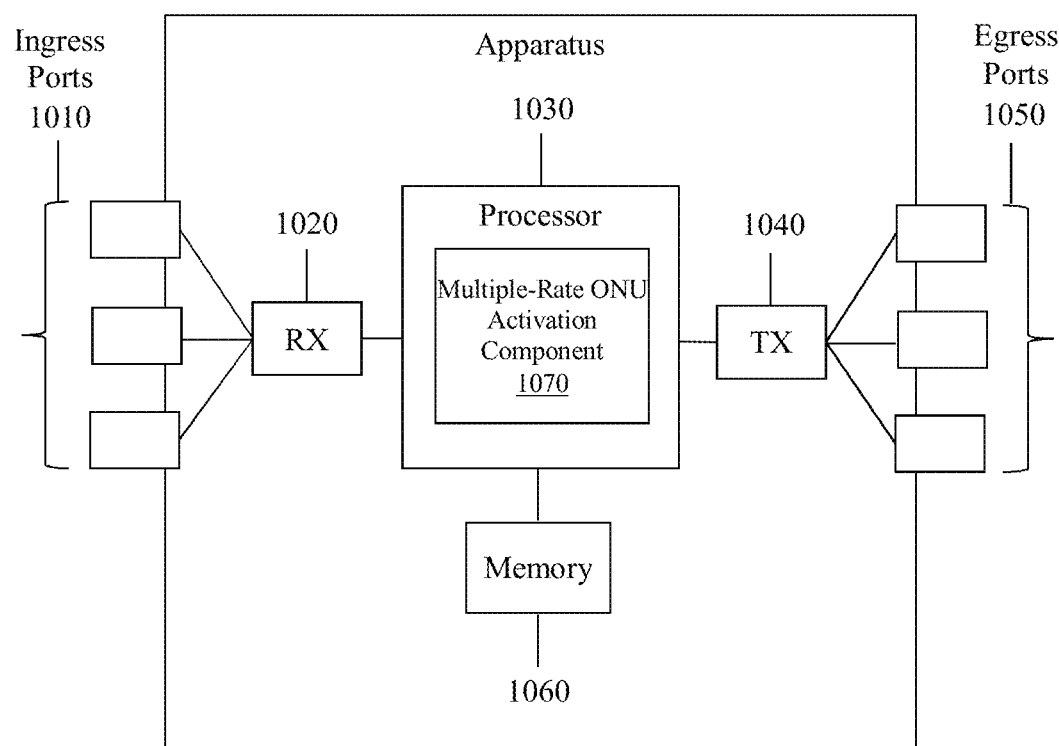
FIG. 10 is a schematic diagram of an apparatus according to an embodiment of the disclosure.

FIG. 10 is a schematic diagram of an apparatus 1000 according to an embodiment of the disclosure. The apparatus 1000 implements the disclosed embodiments, including implementing the OLT 110, the ONUs 120, or any other applicable network device. The apparatus 1000 comprises ingress ports 1010 and an RX 1020 coupled to the ingress ports 1010 to receive data; a processor, logic unit, baseband unit, or CPU 1030 coupled to the RX 1020 to process the data; a TX 1040 coupled to the processor 1030 and egress ports 1050 coupled to the TX 1040 to transmit the data; and a memory 1060 coupled to the processor 1030 to store the data. The apparatus 1000 may also comprise OE components, EO components, or RF components coupled to the ingress ports 1010, the RX 1020, the TX 1040, and the egress ports 1050 to provide ingress or egress of optical signals, electrical signals, or RF signals.

The processor 1030 is any combination of hardware, middleware, firmware, or software. The processor 1030 comprises any combination of one or more CPU chips, cores, FPGAs, ASICs, or DSPs. The processor 1030 communicates with the ingress ports 1010, the RX 1020, the TX 1040, the egress ports 1050, and the memory 1060. The processor 1030 in some embodiments includes or stores a multiple-rate ONU activation component 1070, which implements the disclosed embodiments. The inclusion of the multiple-rate ONU activation component 1070 therefore provides a substantial improvement to the functionality of the apparatus 1000 and effects a transformation of the apparatus 1000 to a different state. Alternatively, the memory 1060 stores the multiple-rate ONU activation component 1070 as instructions, and the processor 1030 executes those instructions.

The memory 1060 comprises any combination of disks, tape drives, or solid-state drives. The apparatus 1000 may use the memory 1060 as an over-flow data storage device to store programs when the apparatus 1000 selects those programs for execution. The apparatus 1000 may use the memory 1060 to store instructions that the apparatus 1000 reads during execution of those programs. The apparatus 1000 may use the memory 1060 to store data that the apparatus 1000 reads and/or generates during execution of those programs. The memory 1060 may be volatile or non-volatile and may be any combination of ROM, RAM, TCAM, or SRAM.

An OLT comprises a processor element configured to generate a first message comprising a first field instructing an ONU to report its data rate capability as at least one of 10 12.5 Gb/s, Gb/s, 25 Gb/s, or 50 Gb/s; a transmitter element coupled to the processor element and configured to transmit the first message to the ONU; and a receiver element coupled to the processor element and configured to receive a second message from the ONU in response to the first message, the second message comprises a second field indicating the data rate capability.

In an example embodiment, the apparatus 1000 includes a message generation module generating a first message comprising a first field instructing reporting of a data rate capability as at least one of 10 Gb/s, 12.5 Gb/s, 25 Gb/s, or 50 Gb/s, a transmission module transmitting the first message, and a reception module receiving a second message in response to the first message, the second message comprises a second field indicating the data rate capability. In some embodiments, the apparatus 1000 may include other or additional modules for performing any one of or combination of steps described in the embodiments. Further, any of the additional or alternative embodiments or aspects of the method, as shown in any of the figures or recited in any of the claims, are also contemplated to include similar modules.

In an example embodiment, the apparatus 1000 includes a reception module receiving a first message comprising a first field instructing reporting of a data rate capability as at least one of 10 Gb/s, 12.5 Gb/s, 25 Gb/s, or 50 Gb/s, a message generation module generating a second message in response to the first message, the second message comprises a second field indicating the data rate capability, and a transmission module transmitting the second message. In some embodiments, the apparatus 1000 may include other or additional modules for performing any one of or combination of steps described in the embodiments. Further, any of the additional or alternative embodiments or aspects of the method, as shown in any of the figures or recited in any of the claims, are also contemplated to include similar modules.

In an example embodiment, the apparatus 1000 includes a message generation module generating an SN grant message comprising an Alloc-ID field, the Alloc-ID field comprises a first value indicating quiet windows for ONUs with upstream line rates of 10 Gb/s, 12.5 Gb/s, 25 Gb/s, or 50 Gb/s, a transmission module transmitting the SN grant message to the ONUs, and a reception module receiving a serial_number_ONU message from a first ONU in response to the SN grant message, the serial_number_ONU message comprises a line rate capability field, the line rate capability field comprises a second value indicating what nominal line rates the first ONU supports, and the first ONU is one of the ONUs. In some embodiments, the apparatus 1000 may include other or additional modules for performing any one of or combination of steps described in the embodiments. Further, any of the additional or alternative embodiments or aspects of the method, as shown in any of the figures or recited in any of the claims, are also contemplated to include similar modules.

In an example embodiment, the apparatus 1000 includes a reception module receiving an SN grant message from an OLT, the SN grant message comprises an Alloc-ID field, and the Alloc-ID field comprises a first value indicating quiet windows for ONUs with upstream line rates of 10 Gb/s, 12.5 Gb/s, 25 Gb/s, or 50 Gb/s, the first ONU is one of the ONUs, a message generation module generating a serial_number_ONU message in response to the SN grant message, the serial_number_ONU message comprises a line rate capability field, and the line rate capability field comprises a second value indicating what nominal line rates the first ONU supports, and a transmission module transmitting the serial_number_ONU message to the OLT. In some embodiments, the apparatus 1000 may include other or additional modules for performing any one of or combination of steps described in the embodiments. Further, any of the additional or alternative embodiments or aspects of the method, as shown in any of the figures or recited in any of the claims, are also contemplated to include similar modules.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other items shown or discussed as coupled may be directly coupled or may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An optical line terminal (OLT) comprising:
    a processor configured to generate a serial number (SN) grant comprising an allocation structure, the allocation structure comprises an allocation identifier (Alloc-ID) equal to 1020 to indicate a 50 gigabits per second (Gbit/s) upstream line rate for an optical network unit (ONU), equal to 1021 to indicate a 25 Gbit/s upstream line rate for the ONU, or equal to 1023 to indicate the 50 Gbit/s upstream line rate or the 25 Gbit/s upstream line rate; and
    a transmitter coupled to the processor and configured to transmit the SN grant to the ONU.

2. The OLT of claim 1, wherein the allocation structure comprises the Alloc-ID equal to 1020 to indicate the 50 Gbit/s upstream line rate, equal to 1021 to indicate the 25 Gbit/s upstream line rate for the ONU, equal to another value to indicate a 12.5 Gbit/s upstream line rate for the ONU, or equal to 1023 to indicate the 50 Gbit/s upstream line rate, the 25 Gbit/s upstream line rate, or the 12.5 Gbit/s upstream line rate.

3. A method implemented by an optical line terminal (OLT), the method comprising:
    generating a serial number (SN) grant comprising an allocation structure, the allocation structure comprises an allocation identifier (Alloc-ID) equal to 1020 to indicate a 50 gigabits per second (Gbit/s) upstream line rate for an optical network unit (ONU), equal to 1021 to indicate a 25 Gbit/s upstream line rate for the ONU, or equal to 1023 to indicate the 50 Gbit/s upstream line rate or the 25 Gbit/s upstream line rate for the ONU; and
    transmitting the SN grant to the ONU.

4. The method of claim 3, wherein the allocation structure comprises the Alloc-ID equal to 1020 to indicate the 50 Gbit/s upstream line rate for the ONU, equal to 1021 to indicate the 25 Gbit/s upstream line rate for the ONU, equal to another value to indicate a 12.5 Gbit/s upstream line rate for the ONU, or equal to 1023 to indicate the 50 Gbit/s upstream line rate, the 25 Gbit/s upstream line rate, or the 12.5 Gbit/s upstream line rate for the ONU.

5. A computer program product comprising instructions that are stored on a computer-readable medium and that, when executed by a processor, cause an optical line terminal (OLT) to:
    generate a serial number (SN) grant comprising an allocation structure, the allocation structure comprises an allocation identifier (Alloc-ID) equal to 1020 to indicate a 50 gigabits per second (Gbit/s) upstream line rate for an optical network unit (ONU), equal to 1021 to indicate a 25 Gbit/s upstream line rate for the ONU, or equal to 1023 to indicate the 50 Gbit/s upstream line rate or the 25 Gbit/s upstream line rate; and transmit the SN grant to the ONU.

6. The computer program product of claim 5, wherein the allocation structure comprises the Alloc-ID equal to 1020 to indicate the 50 Gbit/s upstream line rate for the ONU, equal to 1021 to indicate the 25 Gbit/s upstream line rate for the ONU, equal to another value to indicate a 12.5 Gbit/s upstream line rate for the ONU, or equal to 1023 to indicate the 50 Gbit/s upstream line rate, the 25 Gbit/s upstream line rate, or the 12.5 Gbit/s upstream line rate for the ONU.

7. An optical network unit (ONU) comprising:
a receiver configured to receive a serial number (SN) grant from an optical line terminal (OLT), the SN grant comprises an allocation structure, the allocation structure comprises an allocation identifier (Alloc-ID) equal to 1020 to indicate a 50 gigabits per second (Gbit/s) upstream line rate for the ONU, equal to 1021 to indicate a 25 Gbit/s upstream line rate for the ONU, or equal to 1023 to indicate the 50 Gbit/s upstream line rate or the 25 Gbit/s upstream line rate; and
a processor coupled to the receiver and configured to process the SN grant.

8. The ONU of claim 7, wherein the allocation structure comprises the Alloc-ID equal to 1020 to indicate the 50 Gbit/s upstream line rate for the ONU, equal to 1021 to indicate the 25 Gbit/s upstream line rate for the ONU, equal to another value to indicate a 12.5 Gbit/s upstream line rate for the ONU, or equal to 1023 to indicate the 50 Gbit/s upstream line rate, the 25 Gbit/s upstream line rate, or the 12.5 Gbit/s upstream line rate for the ONU.

9. A method implemented by an optical network unit (ONU), the method comprising:
receiving a serial number (SN) grant from an optical line terminal (OLT), the SN grant comprises an allocation structure, the allocation structure comprises an allocation identifier (Alloc-ID) equal to 1020 to indicate a 50 gigabits per second (Gbit/s) upstream line rate for the ONU, equal to 1021 to indicate a 25 Gbit/s upstream line rate for the ONU, or equal to 1023 to indicate the 50 Gbit/s upstream line rate or the 25 Gbit/s upstream line rate; and
processing the SN grant.

10. The method of claim 9, wherein the allocation structure comprises the Alloc-ID equal to 1020 to indicate the 50 Gbit/s upstream line rate for the ONU, equal to 1021 to indicate the 25 Gbit/s upstream line rate for the ONU, equal to another value to indicate a 12.5 Gbit/s upstream line rate for the ONU, or equal to 1023 to indicate the 50 Gbit/s upstream line rate, the 25 Gbit/s upstream line rate, or the 12.5 Gbit/s upstream line rate for the ONU.

* * * * *

UNITED STATES PATENT AND TRADEMARK OFFICE
CERTIFICATE OF CORRECTION

PATENT NO. : 11,356,755 B2
APPLICATION NO. : 16/926070
DATED : June 7, 2022
INVENTOR(S) : Yuanqiu Luo et al.

Page 1 of 1

It is certified that error appears in the above-identified patent and that said Letters Patent is hereby corrected as shown below:

On the Title Page

Item [56] Delete "CN 182091 A 1/2016" and insert -- CN 105247807 A 1/2016 --

Signed and Sealed this
Second Day of August, 2022

Katherine Kelly Vidal
*Director of the United States Patent and Trademark Office*